Dec. 18, 1956 R. H. DUNN 2,774,534

ELECTRICAL COUNTING AND LIKE DEVICES

Filed July 10, 1952 2 Sheets-Sheet 1

Inventor
ROLAND H. DUNN

By Robert Harding Jr.
Attorney

INVENTOR.
R. H. DUNN
BY
Robert Harding Jr.
ATTORNEY

United States Patent Office 2,774,534

Patented Dec. 18, 1956

2,774,534

ELECTRICAL COUNTING AND LIKE DEVICES

Roland Harris Dunn, London, England, assignor to International Standard Electric Corporation, New York, N. Y., a corporation of Delaware Application July 10, 1952, Serial No. 298,043

Claims priority, application Great Britain July 17, 1951

7 Claims. (Cl. 235—92)

Figure 1:
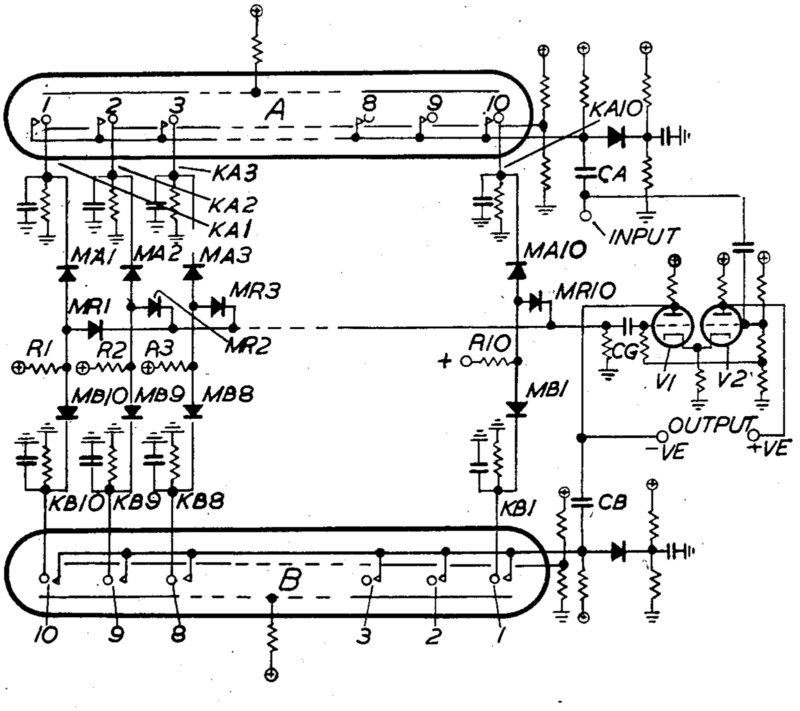

This invention relates to dividers of the type wherein one electric output pulse is delivered for every so many electric input pulses.

Counters of this type have a chain of counting elements corresponding to the frequency divisor required, the response of one counting element to a pulse priming the next adjacent element so that it responds to the next pulse. All the pulses are applied to all the counting elements but only one which has been primed by the response of the previous one can respond to the pulse. At a predetermined point in the chain an output pulse is delivered.

There is a requirement for a counter of this type, with a given number of counting elements which can perform division by a divisor different from the number of elements.

One feature of the present invention comprises a divider which comprises two electrical counting chains and interconnections between pairs of elements determined by the divisor to be used, each said pair consisting of one element from each said chain.

Another feature of the present invention comprises a divider comprising two counting chains, a plurality of sets of interconnections each said interconnection extending between one element of one of said chains and one element of the other of said chains, said sets of interconnections being respectively determined by different divisors, and means for rendering effective any one of said sets of interconnections whereby division by any one of a plurality of divisors may be effected.

Another feature of the present invention comprises a divider which comprises two counting chains each having N elements, said chains being arranged to count in opposite directions, means for applying all incoming impulses to a first one of said counting chains to cause it to step once in response to each received impulse, a plurality of coincidence gates each arranged to interconnect one element of said first chain and one element of the second chain according to a predetermined pattern, and means responsive to detection by any one of said gates of the coincidence that each said chain is operative at the element connected thereto to apply an impulse to said second chain and to an output, whereby the coincidence occurs at an earlier stage in the next operating cycle of said first chain, the number of steps by which said coincidence is advanced being determined by said predetermined pattern of interconnections.

In the embodiments of the invention to be described, these interconnections between pairs of elements are formed by coincidence circuits, and the individual coincidence circuits are connected to an output circuit which is only energised on the response to coincidence of two interconnected elements, one from each chain.

One chain is actuated directly by the input pulses and the other from the output pulses. Each time an output pulse occurs, on a coincidence, the second chain is stepped to another element and the coincidence and consequently the output pulse, occurs in a different position in the next stepping cycle of the first chain.

This progression of the phase of the output pulse in successive cycles of the first chain can be made to proceed evenly in repeated operational cycles and the number of elements skipped in each cycle can be altered between 1 element and N–1 elements where N is the number of elements in each chain, by suitable arrangement of the interconnections between the counting elements of the two trains.

The principle can be applied either to division by a divisor less than N or more than N.

One method of carrying out division by more than N, is to add a binary pair to each interconnection between an element of one chain and an element of the other chain. The binary pairs are then set to correspond with the "lap" being performed by the chains. This arrangement permits division by up to 19.

When using chains having N elements each, the division can be by N by taking the output from only one of the coincidence gates. Thus if the chains are dividing by (N–1), and the output is taken from only one gate, then division by N(N–1) is effected. Similarly the result of division can be divided by N/2 by taking outputs from two coincidence gates if N is divisible by 2 or by N/3 if N is divisible by 3.

The invention will now be described with reference to the accompanying drawing, which shows a circuit using two ten point multicathode tubes as counting chains, the interconnections being such that division by 9 (10–1, i. e. N–1) is effected.

Two ten point multi-gap tubes A and B, which are preferably of the type described in Patent No. 2,553,585, issued May 22, 1951, to G. Hough are used. The cathodes of these tubes are cross-connected in reverse order, i. e. cathodes KA1 and KB10, KA2 and KB9 . . . KA10 and KB1 are interconnected. Each connection between two cathodes comprises a coincidence gate circuit having two rectifiers, e. g. MA1 and MB10, connected to one cathode of each tube, a decoupling rectifier, e. g. MR1, connected to the common point of the other two rectifiers, and a connection via a resistance, e. g. R1, to a source of positive potential. When both the cathodes concerned are discharging the coincidence blocks both rectifiers of the gate and an output from the source of positive potential is given via the decoupling rectifier. A pulse amplifier V1, V2 whose use will be described later is also provided.

Negative going input pulses are applied over CA to the common trigger electrode of tube A, causing that tube to step once on each pulse. Tube A is initially assumed to be standing with the discharge on its first cathode KA1. Means to ensure that this is so, and that the discharge in B is initially at KB1, can be provided, but is not shown. A typical method of doing this would be to apply a temporary negative potential to cathodes KA1 and KB1 on switching on.

On the ninth received impulse the discharge in tube A reaches the tenth and last cathode KA10, when the coincidence gate MA10—MB1 responds to coincidence between the discharges on KA10 and KB1. A positive output is then applied over MR10 and via condenser CG to the grid of tube V1, since both KA10 and KB1 are discharging and rectifier gates MA10 and MB1 are simultaneously blocked. The positive pulse on its grid causes V1 to conduct and to give a negative pulse on its anode, which negative pulse is delivered to the negative output terminal and, via condenser CB to the common trigger electrode of tube B, in which the discharge thereupon steps to its second cathode KB2.

On the tenth received pulse, the discharge in A is stepped to its first cathode KA1. A then continues to step without B responding until the discharge reaches its cathode KA9, which occurs on the 18th pulse. Coincidence, detected by MA9 and MB2, then occurs and a positive output is applied via MR9 and CG to V1, which therefore gives a negative output to the negative output terminal and, via CB, to tube B. Tube B is therefore stepped to its third cathode KB3.

Operation continues in this manner, each coincidence causing an output pulse and stepping KB once. Thus the coincidence occurs one step earlier in each cycle, subsequent coincidences being KA8—KB3 on the 27th pulse, KA7—KB4 on the 36th pulse, KA6—KB5 on the 45th pulse, KA5—KB6 on the 54th pulse, and so on.

In each case, when a coincidence occurs in the cycle of tube A a pulse is applied to tube B to step it once, thereby advancing the point in the cycle of A at which coincidence occurs. In the division by 9 which has been described coincidence occurs one step earlier in each cycle of A. If division by 8 is to be effected, then the coincidence must be advanced by two steps in each cycle. In general, if the chains each have N elements, when division is by N—X the coincidence is advanced in each cycle of the first chain A by X steps. When $X=1$, i. e. division is by N–1, a straight cross-connection between the chains with the chains stepping in opposite directions as described is used. Other divisions will be described, and in these examples it is assumed that $N=10$. Divisors of 8, 7, 6 and 4 will be described, when the divisors are (N–2), (N–3), (N–4) and (N–6) respectively. Such arrangements will need other gating arrangements.

When dividing by 8, i. e. by N–2, the coincidence is advanced by two steps in each cycle of A, so assuming that the first coincidence is always KA10—KB1, the next coincidence will be eight steps later, which is at KA8—KB2. The next after that will be at KA6—KB3. The remaining coincidences are: KA4—KB4, KA2—KB5, KA10 to KB6, KA8—KB7, KA6—KB8, KA4—KB9 and KA2—KB10. It will be noted that there are two coincidence gates connected to each even-numbered element of A, but only one to any element of B.

When division by seven is to be effected, the following ten coincidence gates are needed, and they are set out in the order in which they give outputs. A1—B1, A8—B2, A5—B3, A2—B4, A9—B5, A6—B6, A3—B7, A10—B8, A7—B9, and A4—B10.

For dividing by 6, the following coincidence gates are required: KA10—KB1, KA6—KB2, KA2—KB3, KA8—KB4, KA4—KB5, KA10—KB6, KA6—KB7, KA2—KB8, KA8—KB9 and KA4—KB10. It will be observed that when the divisor is an even number, each even numbered element of A has two coincidence gates connected thereto.

In a similar manner, gating arrangements for division by other numbers less than N, i. e. less than 10 in the embodiment described, can be developed.

Arrangements for dividing by more than N (more than 10 is the circuit shown) have already been briefly described.

Although in the embodiment shown each chain is formed by a single multi-gap tube, it is obvious that any form of counting chain, e. g. a chain of individual gas tubes or flip flops or a relay chain, could be used. Further, although it is convenient that each chain should have the same number of elements, this is not essential. Thus, if it happened to be convenient, two chains having different numbers of elements could be used.

The invention can be used as a "straight" frequency divider, when the frequency to be divided is converted in well-known manner into impulses for application to chain A, or as a pulse divider responding to pulses received randomly. The latter case would be especially useful in certain remote telemetering applications.

A further use of the invention is to provide the two chains with several sets of coincidence gates, one for each of a number of divisors, and arrange that only one of these can be energised at once. This could be done by providing each gate of each set with an additional gating rectifier, when by blocking all the additional gating rectifiers associated with the divisor required that one and that only one is prepared for use. Such an arrangement might be applicable to, say, computation circuits.

Figure 2:
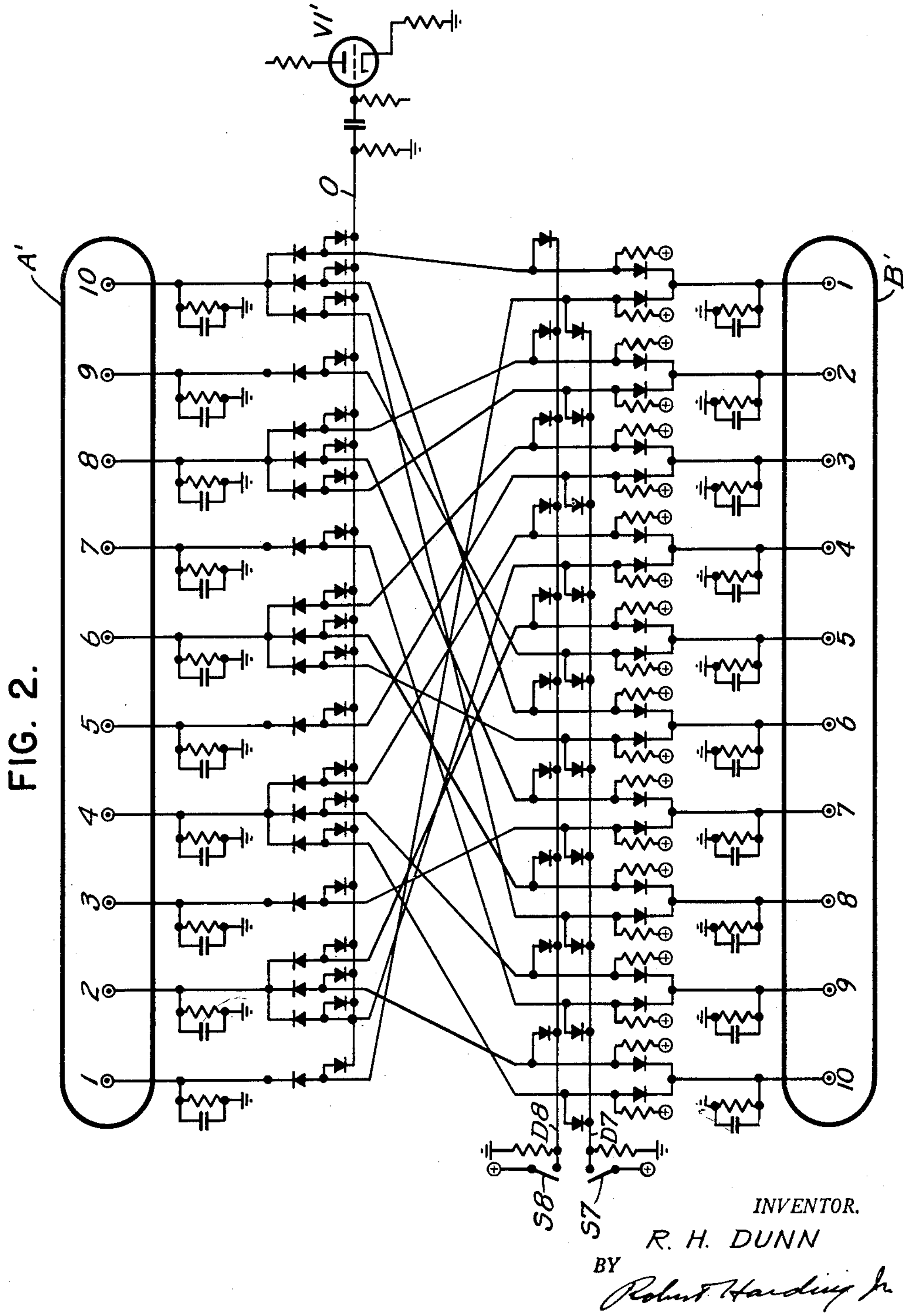

In Fig. 2 an arrangement of this nature is shown having two tubes A′ and B′ corresponding to the tubes A and B of Fig. 1. Whereas Fig. 1 shows one interconnecting circuit connected to each cathode of the two tubes, Fig. 2 shows additional interconnecting circuits, so that there are actually two sets, one for effecting division by 8 and the other effecting division by 7. Each interconnection is connected to the respective cathodes through rectifiers similarly to the arrangement of Fig. 1 and all of the interconnections are connected to the single output circuit by means of separate isolating rectifiers, similarly to the way the interconnections in Fig. 1 are connected to the output circuit.

It will be noted that each cathode of tube B′ has two interconnections connected to it. The left hand interconnection in each case is connected through an isolating rectifier to the control lead D7, and the right hand interconnection in each case is connected through an isolating rectifier to the control lead D8. Both of these control leads are connected through resistances to ground so that normally no potential can be applied from any of the interconnections to the output circuit, because of this ground connection. If, however, key S7 is depressed to connect a positive potential to the control lead D7 all of the rectifiers connected thereto are blocked, and any one of these interconnections can supply an impulse to the output circuit O providing both cathodes connected thereto are discharging. Similarly, if the key S8 is depressed a positive potential is applied to the control lead D8 and all of the rectifiers connected thereto are blocked so that the interconnections associated with these rectifiers can produce an impulse in the output circuit if the pair of cathodes connected to the interconnection are discharging, thus, it will be seen, that one set of interconnections becomes effective if the key S7 is depressed so as to divide by 7 while the other set of interconnections becomes effective if the key S8 is depressed so as to divide by 8.

While the principles of the invention have been described above in connection with specific embodiments, and particular modifications thereof, it is to be clearly understood that this description is made by way of example and not as a limitation on the scope of the invention.

What I claim is:

1. A divider comprising two electrical counting chains, each containing a succession of counting elements, interconnections between predetermined pairs of said elements the particular pairs being used for a particular desired divisor, each pair consisting of one counting element from each of said chains, an output circuit connected with all of said interconnections, means forming part of said interconnections for producing an impulse in said output circuit when both elements of a pair are operated, an input circuit connected to one of said counting chains, said one counting chain being adapted to step when an input impulse is received by said input circuit, and means for causing the other of said counting chains to step when an impulse is produced in said output circuit.

2. A divider comprising two counting chains, each containing a succession of counting elements, a plurality of sets of interconnections, each of said interconnections extending between one element of one of said chains and one element of the other of said chains, the pairs of elements connected by the interconnections of one set being different from the pairs of elements connected by the interconnections of any other set and being determined by a particular divisor, an output circuit connected with all said interconnections, means forming part of said interconnections for producing an impulse in said output circuit when both elements of a pair connected by an interconnection are operated and when the set of interconnections to which said interconnection belongs is effective, an input circuit connected to one of said counting chains, said one chain being adapted to take one step upon the receipt of each impulse by said input circuit, means for causing the other of said counting chains to step when an impulse is produced in said output circuit, and means for rendering effective any one of said sets of interconnections whereby division by any one of a plurality of divisors may be effected.

3. A divider which comprises two counting chains each having N elements, means for applying all incoming impulses to a first one of said counting chains to cause it to step once in response to each received impulse, a plurality of coincidence gates each arranged to interconnect one element of said first chain and one element of the second chain according to a predetermined pattern, said chains being arranged to count in predetermined directions with respect to said predetermined pattern, an output circuit, and means responsive to detection by any one of said gates of the coincidence of operation of both chains at the element connected to said gate for applying an impulse to said second chain and to an output circuit, whereby the coincidence occurs at an earlier stage in the next operating cycle of said first chain, the number of steps by which said coincidence is advanced being determined by said predetermined pattern of interconnections.

4. A divider, as claimed in claim 2, in which each counting chain comprises a single multi-gap electronic discharge tube.

5. A divider, as claimed in claim 1, wherein said counting chains are chains of electronic discharge gaps.

6. A divider, as claimed in claim 5, and in which each counting chain comprises a single multi-gap tube.

7. A divider comprising two multi-cathode gaseous discharge tubes, means for applying incoming impulses to a first one of said tubes to cause it to step once for each received impulse, a plurality of rectifier coincidence gate networks each arranged to interconnect the cathode of a succeeding gap of said first tube and the cathode of one gap of the second tube, said interconnections forming a predetermined pattern, an output circuit, and means responsive to detection by any one of said gate networks of the coincidence of discharge at the cathodes connected thereto for applying an impulse both to said output circuit and to the second tube, said second tube adapted to be stepped once for each impulse so received, whereby the coincidence occurs at an earlier stage in the next operating cycle of said first tube, the number of steps by which said coincidence is advanced being determined by said predetermined pattern of interconnections.

References Cited in the file of this patent

UNITED STATES PATENTS

| | | |
|---|---|---|
| 2,521,789 | Grosdoff | Sept. 12, 1950 |
| 2,606,288 | Chatterton | Aug. 5, 1952 |
| 2,614,169 | Cohen | Oct. 14, 1952 |

OTHER REFERENCES

Electrical Communications, "Multicathode Gas-Tube Counters," by Hough et al. (pages 214–226), September 1950.

Electronic Engineering, "Some Recently Developed Cold Cathode Glow Discharge Tubes and Associated Circuits" (part 3), by Hough et al., June 1952.